Nov. 17, 1942.　　　J. H. BOICEY ET AL　　　2,302,174
METHOD FOR CUTTING GLASS
Filed June 27, 1940　　　2 Sheets-Sheet 1

Inventors
JAMES H. BOICEY.
ROBERT F. LECK.

By Frank Fraser
Attorney

Nov. 17, 1942.     J. H. BOICEY ET AL     2,302,174
METHOD FOR CUTTING GLASS
Filed June 27, 1940     2 Sheets—Sheet 2

Inventors
JAMES H. BOICEY.
ROBERT F. LECK.

By Frank Fraser
Attorney

Patented Nov. 17, 1942

2,302,174

UNITED STATES PATENT OFFICE 2,302,174

METHOD FOR CUTTING GLASS

James H. Boicey and Robert F. Leck, Toledo, Ohio, assignors to Libbey-Owens-Ford Glass Company, Toledo, Ohio, a corporation of Ohio Application June 27, 1940, Serial No. 342,759

2 Claims. (Cl. 49—77)

The present invention relates to an improved method for cutting disks from glass sheets or plates and particularly from laminated safety glass.

Laminated safety glass ordinarily comprises two sheets or lights of glass bonded to one another by an interposed layer of plastic material to form a composite structure. In the cutting of laminated safety glass, it has been customary to first score one of the glass sheets and crack the same along said score line by flexing the laminated sheet with the hands or by the use of pliers, after which the second glass sheet is scored along a line directly opposite the first score line and said second sheet then cracked along its score line. The glass is then separated along the lines of cut by stretching the plastic interlayer, and the plastic finally severed by use of a razor blade or the like.

This invention contemplates the cutting out of disks from laminated safety glass by the general method referred to above but further embodies the provision of a novel method of and apparatus for flexing the glass sheets after scoring to effect the cracking thereof along the lines of cut whereby such operation may be accomplished in a more rapid, accurate and economical manner.

Among other objects of the invention is the provision of a method for flexing the glass sheets along the lines of cut whereby the edges on the cut disks will be smoother and more perpendicular to the plane of the glass; whereby better superimposition of the two pieces of glass forming the disk is obtained; and whereby less flaking of the glass along the lines of cut is caused by the flexing thereof so that fewer chips result.

Other objects and advantages of the invention will become more apparent during the course of the following description, when taken in connection with the accompanying drawings.

In the drawings, wherein like numerals are employed to designate like parts throughout the same:

Figure 1:
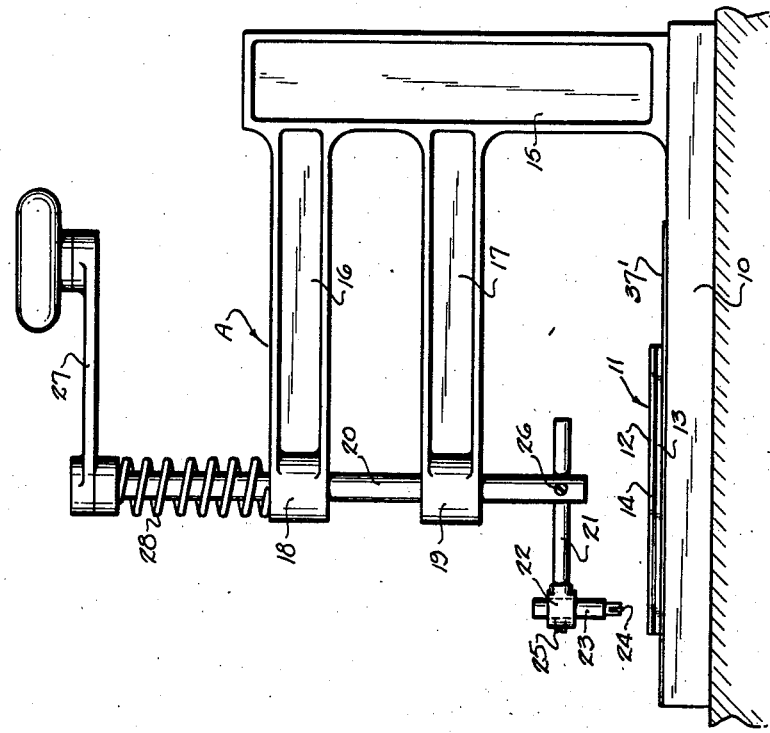
Fig. 1 is a side elevation of apparatus provided by the invention for scoring the glass sheets.
Figure 2:
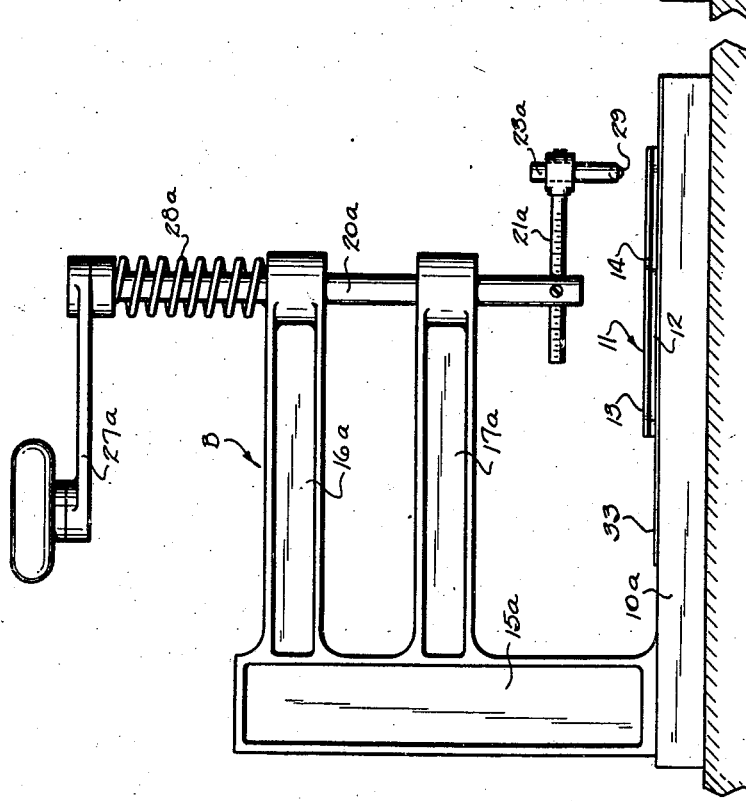
Fig. 2 is a similar view of the apparatus for flexing the glass sheets after scoring to effect the cracking thereof along the score lines.

With reference now to the drawings, the apparatus illustrated in Fig. 1 for scoring the glass sheets and the apparatus illustrated in Fig. 2 for flexing said sheets to cause cracking thereof along the score lines are substantially the same, except for the particular tools used to perform the respective operations upon the glass. The cutting apparatus is designated in its entirety by the letter A and comprises a horizontal base 10 (hereinafter termed the cutting table) for supporting the sheet of laminated safety glass 11 to be cut. As shown, the sheet of laminated safety glass 11 comprises the two sheets or lights of glass 12 and 13 and an interposed layer of plastic material 14 bonded together to form a unitary structure. Secured to the cutting table 10 is a vertical standard 15 carrying the superimposed horizontal arms 16 and 17 provided at their outer ends with vertically aligned bearings 18 and 19 respectively within which is rotatably mounted a vertical shaft 20. The shaft 20 is provided adjacent its lower end with a transverse opening through which is inserted a horizontal rod 21 having a bearing portion 22 at its outer end for receiving the ferrule 23 carrying at its lower end the rotatable steel cutting wheel 24. The cutting ferrule 23 is secured within bearing 22 by a set screw 25, while horizontal rod 21 is secured to shaft 20 by a set screw 26.

The scoring of the glass sheet, supported upon cutting table 10, is accomplished by downward pressure upon shaft 20 and rotation thereof through a complete circle to cause the steel cutting wheel 24 to be moved over and in engagement with the glass in a circular pattern. The size of pattern to be cut can be varied by adjusting the rod 21 horizontally relative to shaft 20 to give the desired radius. The turning of the shaft 20 may be manually effected by means of an operating handle 27 secured to the upper end thereof. The shaft 20 is also normally urged upwardly to maintain the cutting wheel 24 out of contact with the glass by means of a compression spring 28 encircling said shaft and bearing at its opposite ends against bearing 18 and the inner end of operating handle 27.

The flexing apparatus is designated in its entirety by the letter B and, as stated above, is of substantially the same construction as cutting apparatus A; the only difference being that the rotatable steel cutting wheel 24 of the latter is replaced by a freely rotatable ball bearing 29 mounted within a recess 30 in the lower end of ferrule 23a. For the sake of simplicity, those parts of the flexing apparatus B which are similar to corresponding parts of cutting apparatus A are designated by the same reference numerals primed by the letter a.

Figure 3:
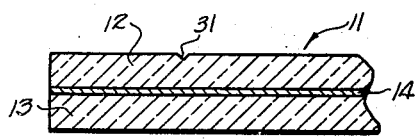
Fig. 3 is a sectional view of a portion of a sheet of laminated safety glass, one sheet of which has been scored.

In carrying out the invention, the sheet of laminated glass 11 to be cut is placed horizontally upon the cutting table 10 of cutting apparatus A and the upper glass sheet 12 thereof scored by turning the handle 27 and simultaneously urging the cutting wheel 24 downwardly into engagement with the glass. Upon turning of the handle 27, the cutting wheel 24 will effect the scoring of the top surface of the glass sheet 12 in a circular pattern as indicated at 31 in Fig. 3.

Figure 4:
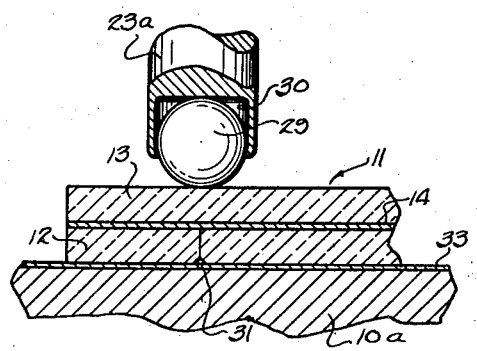
Fig. 4 is a sectional view illustrating the cracking of the glass sheet along the score line.

The sheet of laminated glass 11 is then transferred from the cutting apparatus A to the flexing apparatus B and placed horizontally upon the base 10a thereof which will be hereinafter termed the flexing table. During such transfer, the laminated sheet is turned over so that when placed upon the flexing table 10a the sheet of glass 13 which has not been scored will be uppermost and presented to the ball bearing 29 as shown in Fig. 4. After the glass has been properly positioned upon the flexing table, with the line of cut 31 directly beneath the ball bearing 29, the operating handle 27a is rotated through a path of 360 degrees and at the same time forced downwardly to urge the ball bearing 29 into engagement with the glass. This results in the application of pressure to the glass sheet 13 progressively and continuously along a path directly opposite the line of cut 31 causing running of the cut 31 in glass sheet 12 and the cracking of such sheet along said line.

Figure 5:
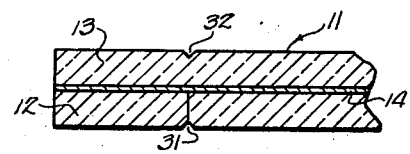
Fig. 5 is a view similar to Fig. 3 but showing one sheet of glass cracked along its score line and the other sheet scored and ready for cracking.
Figure 6:
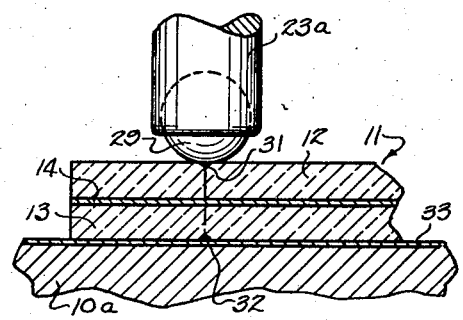
Fig. 6 is a view similar to Fig. 4 illustrating the cracking of the second sheet of glass.

The sheet of laminated glass 11 is then removed from the flexing table 10a and returned to the cutting table 10 where the second sheet of glass 13 is scored along a line of cut directly above and in alignment with the score line 31 in glass sheet 12 as indicated at 32 in Fig. 5. Following this scoring operation, the laminated sheet is again returned, in reverse position, to the flexing apparatus B where pressure is applied to the sheet of glass 12 along the score line 31 thereof as shown in Fig. 6 causing running of the cut in the glass sheet 13 along the score line 32 just applied to the glass whereby to effect the cracking of said sheet along said score line. After the two sheets of glass 12 and 13 have been scored and cracked in the above manner, the cut disk may be removed in any desired manner. For instance, suitable entering cuts may be made in the glass sheets and the glass separated around the score lines 31 and 32 to permit severing or breaking of the plastic interlayer 14.

Figure 7:
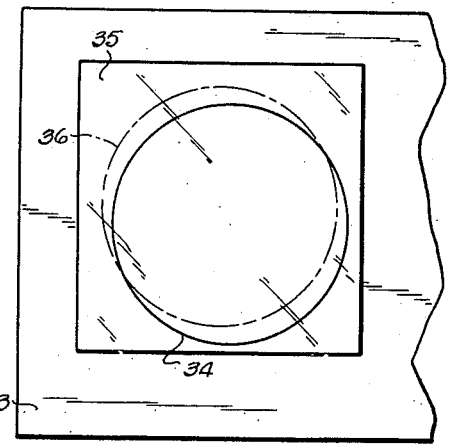
Fig. 7 is a plan view illustrating the means for accurately positioning the scored sheets of glass upon the flexing apparatus.

To facilitate the accurate positioning of the scored laminated sheet 11 upon the flexing table 10a, there is preferably carried by said table a suitable template 33 of paper or the like having marked thereon a circular pattern corresponding to the circular score line and with which said score line is adapted to be aligned. Thus, as shown in Fig. 7, the template 33 has applied thereto a circular pattern 34 of the same size as the disk to be cut and positioned directly beneath the path of travel of the ball bearing 29. The numeral 35 designates a glass sheet, either plain or laminated, scored along the circular line 36, and in positioning the sheet it is placed upon the flexing table in such a manner that the score line 36 will align or register with the circular pattern 35 applied to template 33. This assures that the ball bearing 29 will engage the upper surface of the glass sheet directly above the score line 36.

Likewise, in cutting laminated safety glass and especially when scoring the second sheet of glass, it is essential that such score line be in alignment with the line of cut in the first sheet of glass. Therefore, a similar template 37' may also be carried by the cutting table 10 so that when the laminated glass is returned for the scoring of the second sheet of glass the line of cut in the first sheet can be lined up with the circular pattern applied to the template, thereby assuring that the two lines of cut will be directly opposite one another.

We have found by actual use that disks can be cut from sheets of laminated safety glass by the above method and apparatus in a rapid, accurate and economical manner. Further, that smoother edges can be obtained on the circular pieces of glass as well as better superimposition of the two pieces of glass constituting the lamination. It has likewise been observed that less flaking of the glass along the score lines results when the glass is flexed in this manner whereby minimum chipping of the edges is obtained. Although in some cases it may be necessary to perform some edge work on the edges of the cut disks, it has been found that due to the better cutting of the circles resulting from the use of our method and apparatus considerably less edge work is required.

It has been found practical to score a large number of circles on one sheet of glass at the same time and to then transfer the laminated sheet to the flexing apparatus where the glass can be cracked along all of the cut circles. After all of the circular cuts in the one sheet of glass have been obtained, the laminated sheet may be returned to the scoring apparatus and the process repeated. While it is preferred to use a ball bearing 29 as the pressure element for flexing the glass sheets because of its rolling and substantially point contact with the glass, other types of pressure elements, either stationary or movable, may be used if desired.

Figure 8:
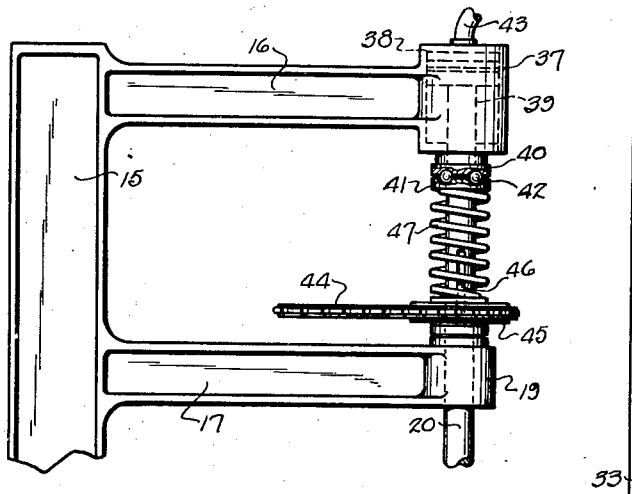
Fig. 8 is a side elevation of a modified form of apparatus which may be employed either in the scoring of the glass sheets or the flexing thereof.

If desired, instead of operating the scoring and flexing devices A and B by hand, they could be power actuated. For instance, instead of applying downward pressure to the handle 27 or 27a by hand, an air piston could be associated with the upper end of the respective shaft 20 or 20a as shown in Fig. 8. In such figure, the outer end of arm 16 is provided with a cylinder 37 within which is mounted a piston 38 carried at the upper end of a piston rod 39, said piston rod passing downwardly through the bottom of cylinder 37 and provided at its lower end with a circumferential flange 40. The upper end of the shaft 20 or 20a is also provided with a circumferential flange 41 and interposed between said flanges 40 and 41 are ball bearings 42 which permit rotation of shaft 20 or 20a relative to piston rod 39. A pipe 43 leading to the upper end of cylinder 37 is adapted to supply the compressed air thereto. The shaft 20 or 20a is also positively driven by means of a sprocket chain 44 trained about a sprocket 45 carried by said shaft and driven from suitable source of power. In order to permit rotation of the shaft 20 or 20a simultaneous with vertical movement thereof, the sprocket 45 may be provided with a key slidable within a vertical key-way 46 in said shaft. The shaft 20 or 20a is normally urged upwardly, by means of a compression spring 47, to maintain the cutting tool or flexing element out of engagement with the glass.

We have found that less pressure is required to bring about running of the cut, using the same type of glass and all other conditions being equal, when a soft plastic interlayer is employed than when a hard plastic interlayer is used. Where hard plastic interlayers are employed less pressure can of course be resorted to by heating the lamination to soften the plastic interlayer; the temperature of heating being limited only by the destruction of the stability of the lamination or the production of defects therein. Less pressure is also required in the cutting of laminated glass where the plastic interlayer is thicker than where a thin layer is employed.

Although the invention has been illustrated in the drawings and particularly described hereinabove in connection with the cutting out of disks from laminated safety glass, the same method and apparatus has been found practical for scoring and running the cuts on ordinary sheets of glass. In such case, the single sheet of glass would be scored upon one side by the scoring apparatus A, turned over and transferred to the flexing apparatus B, so that the pressure applied by the ball bearing would follow a path along the scored line but on the surface of the glass opposite to that which had been scored.

Likewise, while the invention has been described hereinabove in connection with the cutting of disks or circular pieces from glass sheets or plates, it will be apparent that the method may also be practiced in cutting pieces of glass of other shapes from the sheets or plates. Therefore, the word "disk," as used in the specification and claims, is to be given a broad interpretation to include not only circular pieces but pieces of glass which are non-circular or approximately circular. Obviously, it is not essential to the carrying out of the method above described that the cutting apparatus and flexing apparatus be of the same construction.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The method of cutting disks from laminated safety glass including two sheets of glass and an interposed layer of plastic material, comprising first scoring one sheet of glass, then applying pressure to the second glass sheet progressively and continuously along a path opposed to the score line to effect flexing of the laminated sheet and cracking of the first glass sheet along said score line, then scoring the second sheet of glass along a line opposed to the first score line, and then applying pressure to the first sheet of glass progressively and continuously along the line of cut thereof to flex the laminated sheet and cause cracking of the second sheet of glass along its score line.

2. The method of cutting disks from laminated safety glass including two sheets of glass and an interposed layer of plastic material, comprising first scoring one sheet of glass, then applying rolling pressure and substantially point contact to the second glass sheet progressively and continuously along a path opposed to the score line to effect flexing of the laminated sheet and cracking of the first glass sheet along said score line, then scoring the second sheet of glass along a line opposed to the first score line, and then applying rolling pressure and substantially point contact to the first sheet of glass progressively and continuously along the line of cut thereof to flex the laminated sheet and cause cracking of the second sheet of glass along its score line.

JAMES H. BOICEY.
ROBERT F. LECK.